(12) United States Patent
Hashimoto et al.

(10) Patent No.: US 11,893,660 B2
(45) Date of Patent: Feb. 6, 2024

(54) IMAGE PROCESSING DEVICE AND IMAGE PROCESSING METHOD

(71) Applicant: HAMAMATSU PHOTONICS K.K., Hamamatsu (JP)

(72) Inventors: Fumio Hashimoto, Hamamatsu (JP); Kibo Ote, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 133 days.

(21) Appl. No.: 17/428,693

(22) PCT Filed: Jan. 29, 2020

(86) PCT No.: PCT/JP2020/003268
§ 371 (c)(1),
(2) Date: Aug. 5, 2021

(87) PCT Pub. No.: WO2020/162296
PCT Pub. Date: Aug. 13, 2020

(65) Prior Publication Data
US 2022/0114772 A1 Apr. 14, 2022

(30) Foreign Application Priority Data
Feb. 7, 2019 (JP) ................................ 2019-020467

(51) Int. Cl.
*G06T 11/20* (2006.01)
*G06T 11/00* (2006.01)

(52) U.S. Cl.
CPC ........ *G06T 11/003* (2013.01); *G06T 2210/41* (2013.01)

(58) Field of Classification Search
CPC ..................................................... G06T 11/03
See application file for complete search history.

(56) References Cited

U.S. PATENT DOCUMENTS

| 11,222,447 B2 * | 1/2022 | Hu ...................... A61B 6/5264 |
| 2017/0039738 A1 | 2/2017 | Ziv et al. |

(Continued)

FOREIGN PATENT DOCUMENTS

| CN | 103955899 A | 7/2014 |
| CN | 109009179 A | 12/2018 |

(Continued)

OTHER PUBLICATIONS

Gong, Kuang et al., "PET Image Reconstruction Using Deep Image Prior," IEEE Transactions on Medical Imaging, 2018, pp. 1-11.

(Continued)

*Primary Examiner* — Oneal R Mistry
(74) *Attorney, Agent, or Firm* — Faegre Drinker Biddle & Reath LLP

(57) ABSTRACT

An image processing apparatus includes a first image creation unit, a second image creation unit, and a CNN processing unit. The first image creation unit creates a first tomographic image of an m-th frame using a data group in list data included in the m-th frame. The second image creation unit creates a second tomographic image using a data group in the list data having a data amount larger than that of the data group used in creating the first tomographic image. The CNN processing unit inputs the second tomographic image to a CNN, outputs an output tomographic image from the CNN, trains the CNN based on a comparison between the output tomographic image and the first tomographic image, and repeats the training operation to generate the output tomographic image in each training.

14 Claims, 25 Drawing Sheets

(56) References Cited

U.S. PATENT DOCUMENTS

| | | | |
|---|---|---|---|
| 2018/0018757 A1 | 1/2018 | Suzuki | |
| 2018/0350066 A1* | 12/2018 | Zuyev | G06T 11/008 |
| 2019/0362522 A1* | 11/2019 | Han | A61N 5/1039 |
| 2019/0378278 A1* | 12/2019 | Bose | G06T 7/149 |
| 2020/0051239 A1* | 2/2020 | Braun | G01R 33/543 |
| 2020/0054306 A1* | 2/2020 | Mehanian | A61B 8/5223 |
| 2020/0327309 A1* | 10/2020 | Cheng | G06N 3/084 |
| 2021/0027436 A1* | 1/2021 | Banerjee | A61B 5/7267 |

FOREIGN PATENT DOCUMENTS

| | | |
|---|---|---|
| CN | 109166161 A | 1/2019 |
| CN | 109272472 A | 1/2019 |
| JP | 2018-110866 A | 7/2018 |
| JP | 2019-202087 A | 11/2019 |
| WO | WO 2018/048507 A1 | 3/2018 |

OTHER PUBLICATIONS

Hashimoto, F. et al., "Denoising of Dynamic Sinogram by Image Guided Filtering for Positron Emission Tomography," IEEE Transactions on Radiation and Plasma Medical Sciences, 2018, vol. 2, No. 6, pp. 541-548.

Hashimoto, F. et al., "Dynamic PET Image Denoising Using Deep Convolutional Neural Networks Without Prior Training Datasets," IEEE Access, 2019, vol. 7, pp. 96594-96603.

Lu, Lijun et al., "Dynamic PET Denoising Incorporating a Composite Image Guided Filter," IEEE Nuclear Science Symposium and Medical Imaging Conference (NSS/MIC), 2014.

Ote, Kibo et al., "PET Image Noise Removal by Convolutional; Neural Networks," Medical Imaging Technology, 2019, vol. 37 No. 1, pp. 35-45, including English abstract.

Ulyanov, Dmitry et al., "Deep Image Prior," arXiv preprint; arXiv:1711.10925, 2017.

Ulyanov, Dmitry et al., "Deep Image Prior," arXiv:1711.10925v3; [cs.CV], Apr. 5, 2018.

International Preliminary Report on Patentability dated Aug. 19, 2021 for PCT/JP2020/003268.

Gao Jingzhi, Liu Yi, Zhang Quan, et al., "Improved deep residual convolutional neural network for LDCT image estimation", Computer Engineering and Applications, Aug. 15, 2018, 54 (16), p. 203-p. 210, including Abstract and Partial English-language translation.

* cited by examiner

IMAGE PROCESSING DEVICE AND IMAGE PROCESSING METHOD

TECHNICAL FIELD

The present disclosure relates to an apparatus and a method for creating a tomographic image after noise removal processing based on list data collected by a radiation tomography apparatus.

BACKGROUND ART

Radiation tomography apparatuses capable of acquiring a tomographic image of an object (living body) include a positron emission tomography (PET) apparatus and a single photon emission computed tomography (SPECT) apparatus.

The PET apparatus includes a detection unit having a large number of small radiation detectors arranged around a measurement space in which the object is placed. The PET apparatus detects a photon pair of an energy of 511 keV generated by electron-positron annihilation in the object into which a positron-emitting isotope (RI source) is introduced by a coincidence method using the detection unit, and collects coincidence information. Then, a tomographic image showing a spatial distribution of generation frequency of the photon pairs in the measurement space (that is, a spatial distribution of the RI sources) can be reconstructed based on the collected many pieces of coincidence information.

In this case, a dynamic PET image including tomographic images of a plurality of frames can be obtained by dividing list data in which coincidence information collected by the PET apparatus is arranged in time series into the plurality of frames in a collection order, and performing image reconstruction processing using a data group included in each frame in the list data. The PET apparatus plays an important role in a nuclear medicine field and the like, and can be used to study, for example, a biological function or a brain high-order function.

The reconstructed tomographic image contains a lot of noise, and therefore, noise removal processing by an image filter is necessary. Examples of the image filter used for the noise removal include a Gaussian filter and a guided filter. Conventionally, the Gaussian filter is used. On the other hand, the guided filter is developed in recent years, and has a feature of being able to preserve a boundary of shading in the image compared to the Gaussian filter.

Patent Document 1 and Non Patent Documents 1 and 2 describe techniques for removing noise in a dynamic PET image by the guided filter. The technique described in Patent Document 1 and Non Patent Document 1 uses, as a guidance image, an image obtained by integrating the dynamic PET image including tomographic images of a plurality of frames in the noise removal processing using the guided filter. Further, the technique described in Non Patent Document 2 enables more effective noise removal by using a more appropriate guidance image.

Non Patent Document 3 describes a technique for removing noise from a PET image by a Deep Image Prior technique (Non Patent Document 4) using a convolutional neural network (CNN), which is a type of a deep neural network (DNN).

CITATION LIST

Patent Literature

Patent Document 1: Chinese Patent Application Laid-Open Publication No. 103955899

Non Patent Literature

Non Patent Document 1: Lijun Lu et al., "Dynamic PET Denoising Incorporating a Composite Image Guided Filter", IEEE Nuclear Science Symposium and Medical Imaging Conference (NSS/MIC), 2014

Non Patent Document 2: F. Hashimoto et al., "Denoising of Dynamic Sinogram by Image Guided Filtering for Positron Emission Tomography", IEEE Transactions on Radiation and Plasma Medical Sciences, Vol. 2 No. 6, pp. 541-548, 2018

Non Patent Document 3: Kuang Gong et al., "PET Image Reconstruction Using Deep Image Prior", IEEE Transactions on Medical Imaging, 2018

Non Patent Document 4: Dmitry Ulyanov et al., "Deep Image Prior", arXiv preprint arXiv:1711.10925, 2017

SUMMARY OF INVENTION

Technical Problem

The noise removal processing for the PET image by the techniques described in Patent Document 1 and Non Patent Documents 1 to 3 is superior in noise removal performance compared to the case of using the Gaussian filter. However, further improvement in noise removal performance is desired for PET images and SPECT images.

An object of the present invention is to provide an apparatus and a method capable of creating a noise-removed tomographic image with high performance based on list data collected by a radiation tomography apparatus.

Solution to Problem

An embodiment of the present invention is an image processing apparatus. The image processing apparatus is an apparatus for creating a tomographic image after noise removal processing based on list data collected by a radiation tomography apparatus, and includes (1) a first image creation unit for dividing the list data into a plurality of frames in a collection order, and performing reconstruction processing for each of the plurality of frames using a data group in the list data included in the frame to create a first tomographic image of the frame; (2) a second image creation unit for performing reconstruction processing using a data group in the list data having a data amount larger than that of the data group used in creating the first tomographic image of each frame in the first image creation unit to create a second tomographic image; and (3) a CNN processing unit for generating a plurality of output tomographic images by, for each of the plurality of frames, repeatedly inputting the second tomographic image to a convolutional neural network, outputting an output tomographic image from the convolutional neural network, and training the convolutional neural network based on a comparison between the output tomographic image and the first tomographic image.

An embodiment of the present invention is a radiation tomography system. The radiation tomography system includes a radiation tomography apparatus for collecting list data for reconstructing a tomographic image of an object;

and the image processing apparatus of the above configuration for creating the tomographic image after the noise removal processing based on the list data collected by the radiation tomography apparatus.

An embodiment of the present invention is an image processing method. The image processing method is a method for creating a tomographic image after noise removal processing based on list data collected by a radiation tomography apparatus, and includes (1) a first image creation step of dividing the list data into a plurality of frames in a collection order, and performing reconstruction processing for each of the plurality of frames using a data group in the list data included in the frame to create a first tomographic image of the frame; (2) a second image creation step of performing reconstruction processing using a data group in the list data having a data amount larger than that of the data group used in creating the first tomographic image of each frame in the first image creation step to create a second tomographic image; and (3) a CNN processing step of generating a plurality of output tomographic images by, for each of the plurality of frames, repeatedly inputting the second tomographic image to a convolutional neural network, outputting an output tomographic image from the convolutional neural network, and training the convolutional neural network based on a comparison between the output tomographic image and the first tomographic image.

Advantageous Effects of Invention

According to the embodiments of the present invention, a noise-removed tomographic image can be created with high performance based on list data collected by a radiation tomography apparatus.

DESCRIPTION OF EMBODIMENTS

Hereinafter, embodiments of an image processing apparatus and an image processing method will be described in detail with reference to the accompanying drawings. In the description of the drawings, the same elements will be denoted by the same reference signs, without redundant description. The present invention is not limited to these examples.

Figure 1:
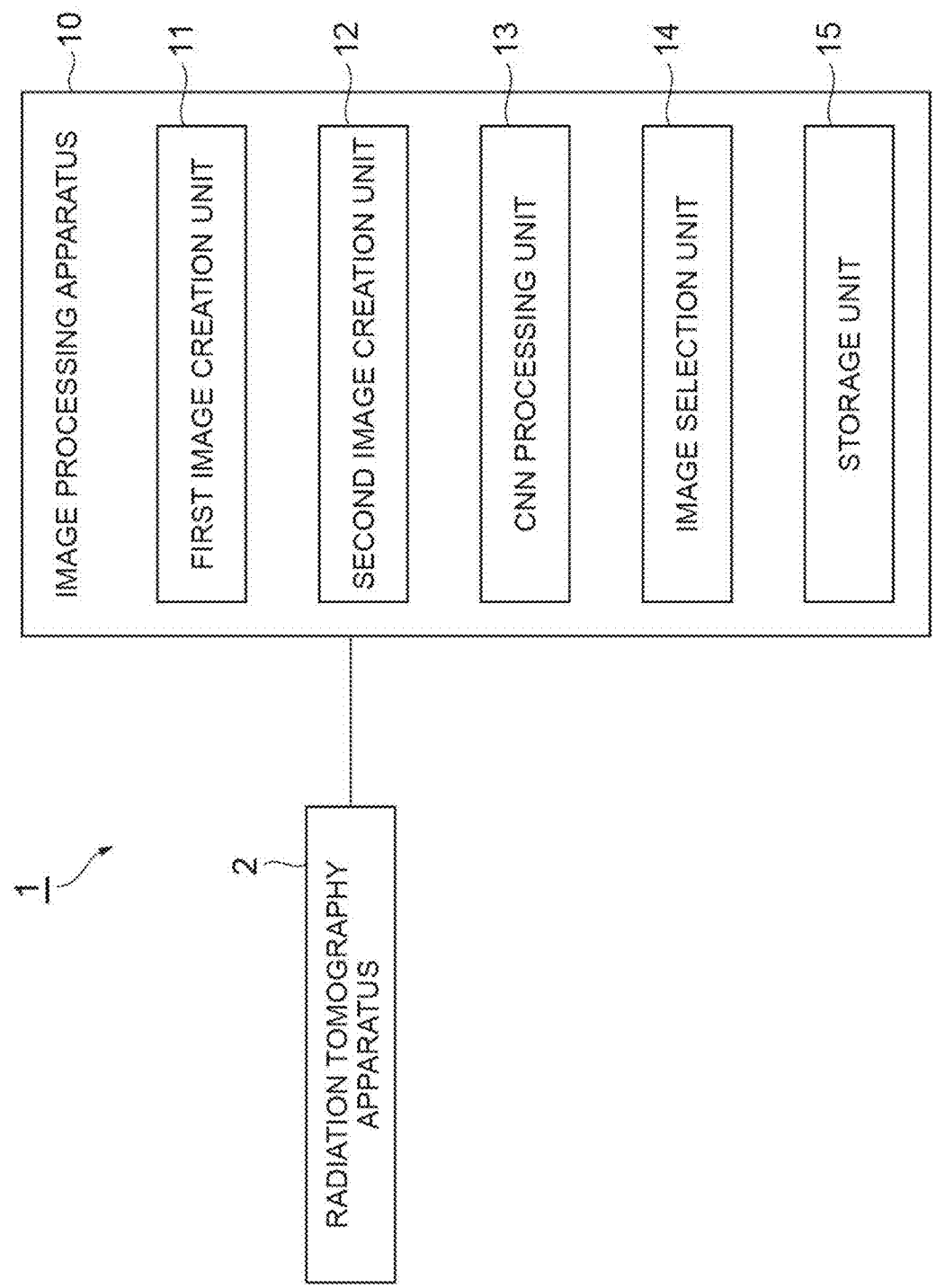
FIG. 1 is a diagram illustrating a configuration of a radiation tomography system.

FIG. 1 is a diagram illustrating a configuration of a radiation tomography system 1. The radiation tomography system 1 includes a radiation tomography apparatus 2 and an image processing apparatus 10. The image processing apparatus 10 includes a first image creation unit 11, a second image creation unit 12, a CNN processing unit 13, an image selection unit 14, and a storage unit 15. A computer including a CPU, a RAM, a ROM, a hard disk drive, and the like is used as the image processing apparatus 10. Further, the image processing apparatus 10 includes an input unit (for example, a keyboard or a mouse) that receives an input of an operator, and a display unit (for example, a liquid crystal display) that displays an image and the like.

The radiation tomography apparatus 2 is an apparatus for collecting list data for reconstructing a tomographic image of an object. Examples of the radiation tomography apparatus 2 include a PET apparatus and a SPECT apparatus. Hereinafter, the radiation tomography apparatus 2 will be described as a PET apparatus.

The radiation tomography apparatus 2 includes a detection unit having a plurality of small radiation detectors arranged around a measurement space in which the object is placed. The radiation tomography apparatus 2 detects a photon pair having an energy of 511 keV, which is generated by electron-positron annihilation in the object into which a positron-emitting isotope (RI source) is introduced, by a coincidence method using the detection unit, and accumulates coincidence information. Further, the radiation tomography apparatus 2 outputs, as the list data, data in which accumulated many pieces of coincidence information are arranged in time series to the image processing apparatus 10.

The list data includes identification information and detection time information of a pair of radiation detectors used in coincidence detection of the photon pair. The list data may further include energy information of photons detected by each radiation detector and detection time difference information of a pair of radiation detectors.

The image processing apparatus 10 reconstructs a tomographic image based on the list data. As techniques for reconstructing a tomographic image based on list data, a maximum likelihood expectation maximization (ML-EM) method, and a successive approximation type image reconstruction technique based on a block iterative method obtained by improving the above method are known. Further, as the successive approximation type image reconstruction technique by the block iterative method, an ordered subset ML-EM (OSEM) method, a row-action maximum likelihood algorithm (RAMLA) method, a dynamic RAMLA (DRAMA) method, and the like are known. Further, the image processing apparatus 10 creates a tomographic image after noise removal processing using a convolutional neural network (CNN).

The first image creation unit 11 divides the list data into a plurality of frames (first to M-th frames) in a collection order, performs reconstruction processing for each of the plurality of frames using a data group included in the m-th frame in the list data, and creates a first tomographic image $D_m$ of the m-th frame. The first tomographic images $D_1$ to $D_M$ are dynamic PET images.

The second image creation unit 12 creates a second tomographic image $S_m$ by performing reconstruction processing using a data group having a data amount larger than that of the data group used in creating the first tomographic image $D_m$ of the m-th frame in the list data in the first image creation unit 11. The second tomographic image $S_m$ may be a static PET image. The second tomographic image may be created for each frame, may be created in common for all frames, or may be created in common for some frames.

The first image creation unit 11 and the second image creation unit 12 may be provided in common or may be provided separately.

Figure 2:
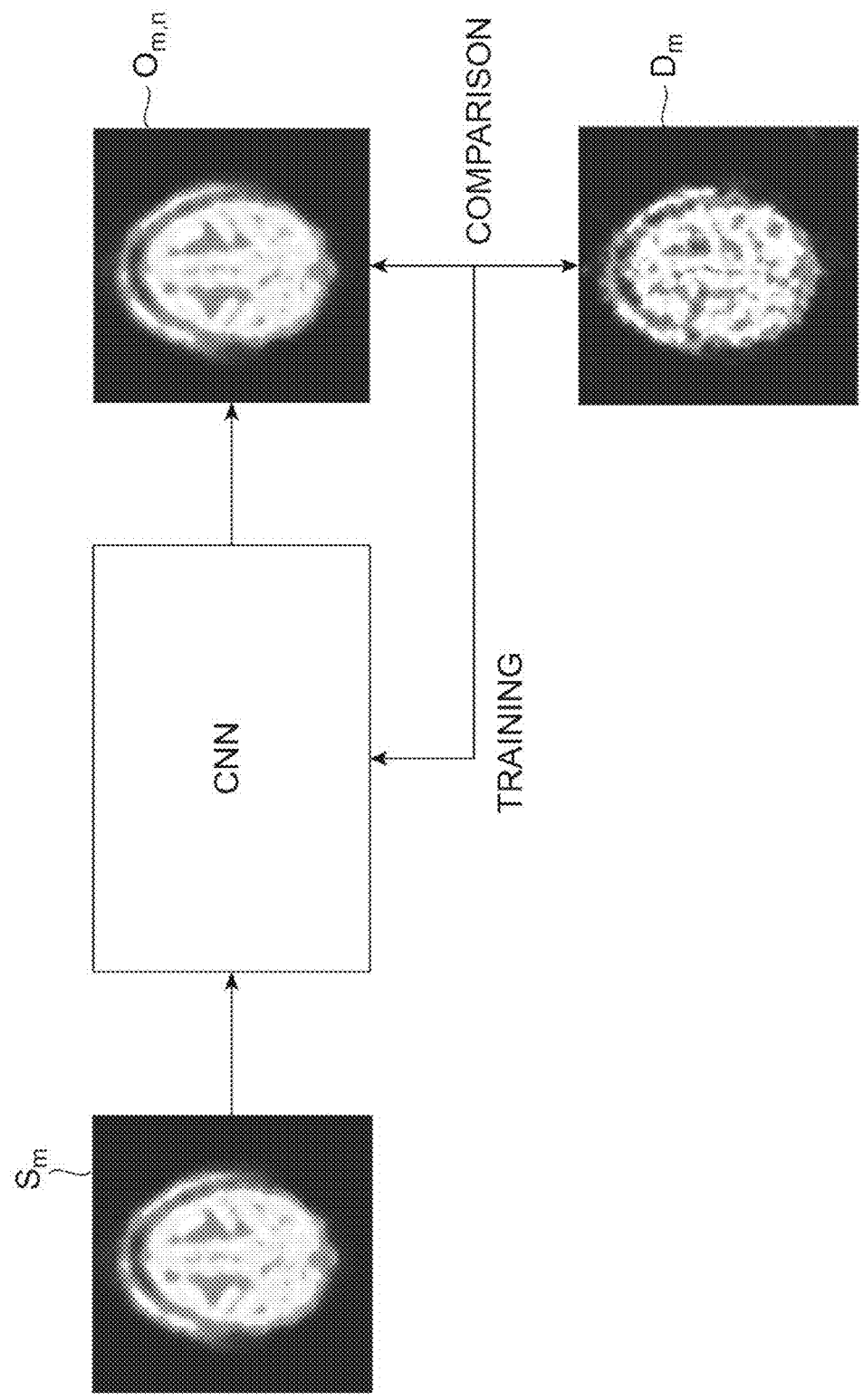
FIG. 2 is a diagram illustrating a CNN processing unit.

As illustrated in FIG. 2, for each of the first to M-th frames, the CNN processing unit 13 inputs the second tomographic image $S_m$ to the CNN, and outputs an output tomographic image $O_m$ from the CNN. The CNN processing unit 13 compares the output tomographic image $O_m$ with the first tomographic image $D_m$, and trains the CNN based on the comparison result. The CNN processing unit 13 repeats the above training operation, and generates the output tomographic image $O_{m,n}$ in each training.

The output tomographic image $O_{m,n}$ is an output tomographic image output from the CNN after (n−1) times of training of the CNN using the first tomographic image $D_m$ and the second tomographic image $S_m$ for the m-th frame. The output tomographic image $O_{m,1}$ is an output tomographic image output from the CNN in a state where no training has been performed.

The image selection unit 14 selects, for each of the first to M-th frames, any one output tomographic image from the plurality of output tomographic images $O_{m,1}$ to $O_{m,N}$ as the tomographic image after the noise removal processing. Preferably, the image selection unit 14 selects one output tomographic image from the plurality of output tomographic images $O_{m,1}$ to $O_{m,N}$ based on a comparison between the output tomographic image $O_{m,n}$ and the second tomographic image $S_m$.

For example, an output tomographic image that minimizes the error between the output tomographic image $O_{m,n}$ and the second tomographic image $S_m$ may be selected, or any one output tomographic image in one or two or more output tomographic images with which the error between the output tomographic image $O_{m,n}$ and the second tomographic image $S_m$ becomes a threshold value or less may be selected. Further, a doctor, an operator, or the like may select one output tomographic image from the plurality of output tomographic images $O_{m,1}$ to $O_{m,N}$.

The storage unit 15 stores the list data, and stores the first tomographic image $D_m$ and the second tomographic image $S_m$ of each frame. Further, the storage unit 15 stores the plurality of output tomographic images $O_{m,1}$ to $O_{m,N}$ of each frame, and stores the output tomographic image selected from them.

Figure 3:
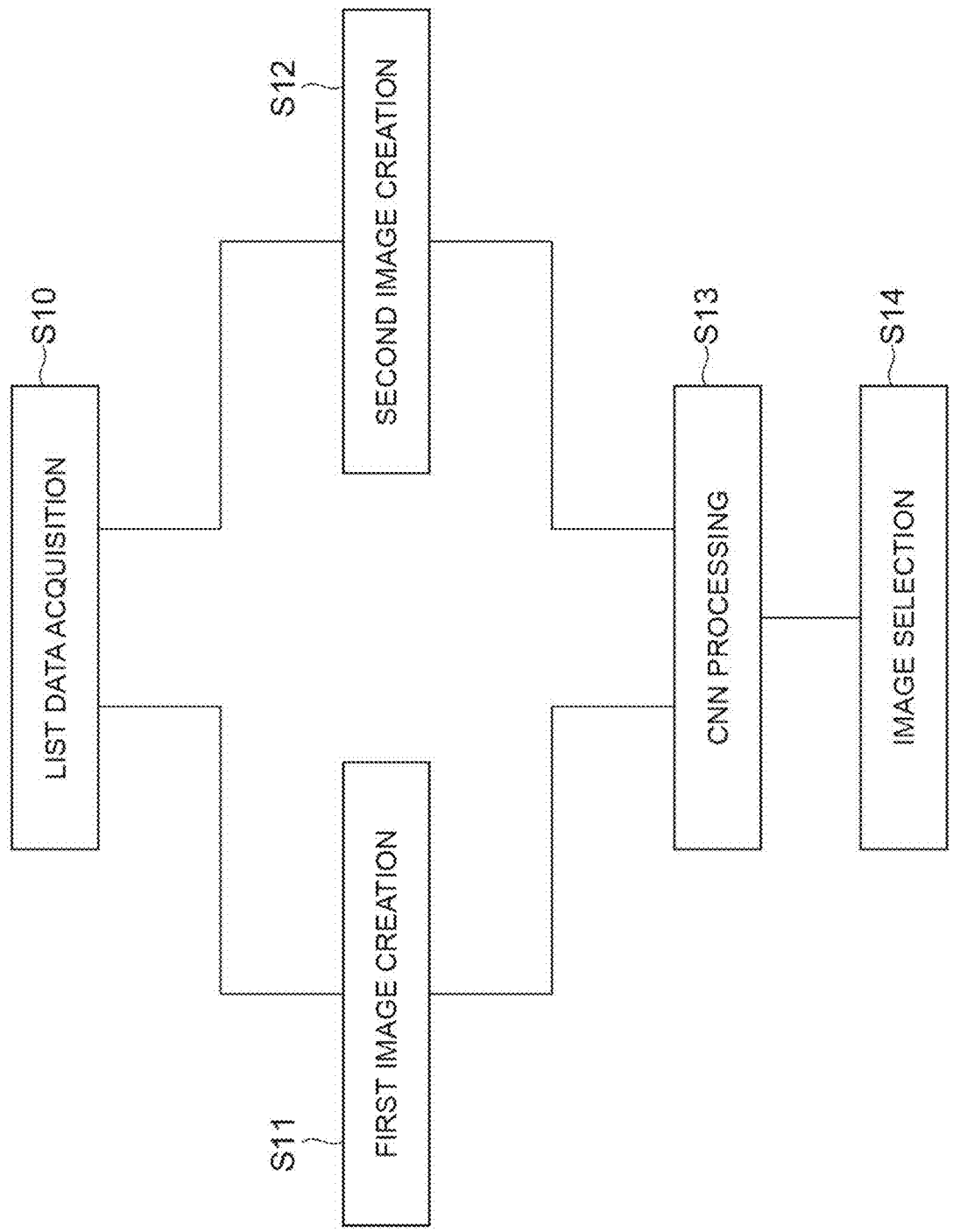
FIG. 3 is a flowchart illustrating an image processing method.

FIG. 3 is a flowchart illustrating an image processing method. The image processing method includes a list data acquisition step S10 for acquiring the list data collected by the radiation tomography apparatus 2, a first image creation step S11 performed by the first image creation unit 11, a second image creation step S12 performed by the second image creation unit 12, a CNN processing step S13 performed by the CNN processing unit 13, and an image selection step S14 performed by the image selection unit 14.

In the list data acquisition step S10, the list data collected by the radiation tomography apparatus 2 is acquired. In the first image creation step S11, the list data is divided into the plurality of frames (first to M-th frames) in the collection order, and for each of the plurality of frames, reconstruction processing is performed using a data group included in the m-th frame in the list data to create the first tomographic image $D_m$ of the m-th frame. In the second image creation step S12, reconstruction processing is performed using a data group in the list data having a data amount larger than that of the data group used in creating the first tomographic image $D_m$ of the m-th frame in the first image creation unit 11 to create the second tomographic image $S_m$. The first image creation step S11 and the second image creation step S12 may be performed in an arbitrary order or may be performed in parallel.

In the CNN processing step S13, for each of the first to M-th frames, the second tomographic image $S_m$ is input to the CNN, and the output tomographic image $O_m$ is output from the CNN. The CNN is trained based on a comparison between the output tomographic image $O_m$ and the first tomographic image $D_m$. The above training operation is repeated to generate the output tomographic image $O_{m,n}$ in each training operation. In the image selection step S14, for each of the first to M-th frames, one output tomographic image is selected from the plurality of output tomographic images $O_{m,1}$ to $O_{m,N}$ as the tomographic image after the noise removal processing.

Figure 4:
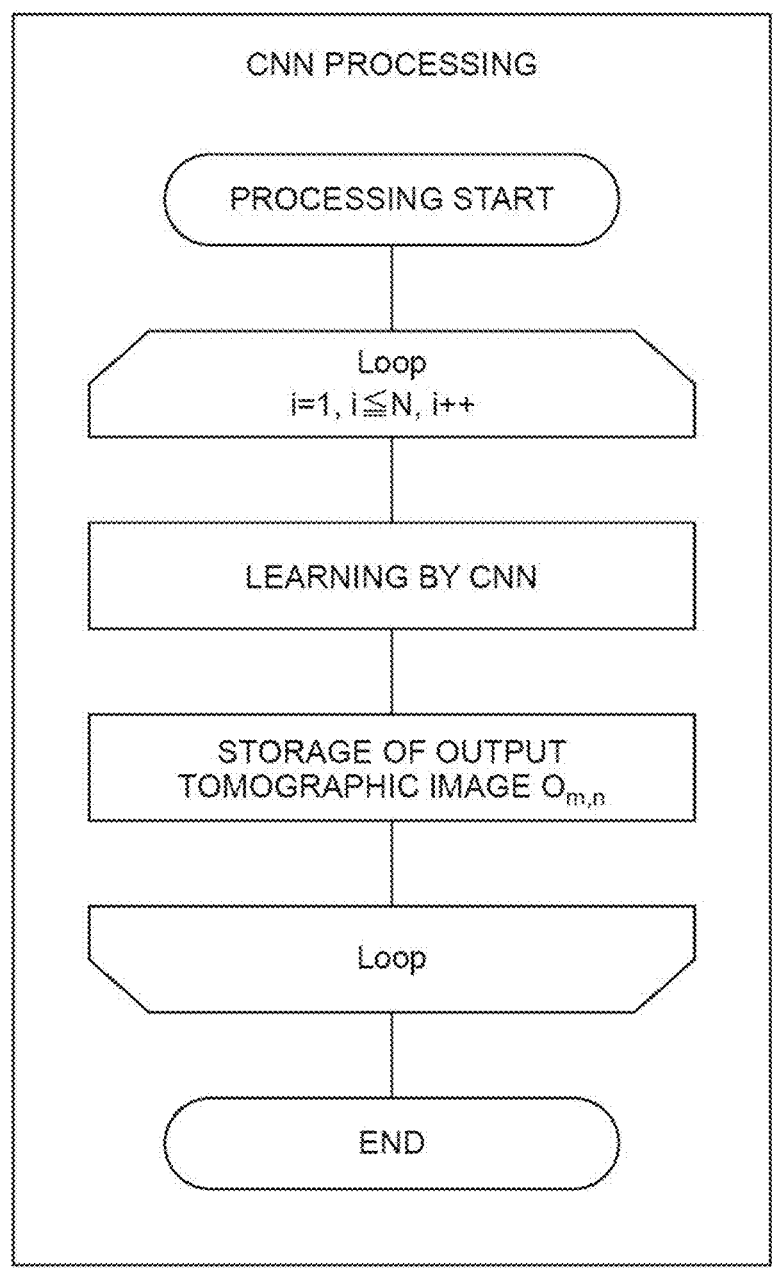
FIG. 4 is a flowchart illustrating an operation of the CNN processing unit and a CNN processing step S13.

FIG. 4 is a flowchart illustrating the operation of the CNN processing unit 13 and the CNN processing step S13. In this example, for each of the first to M-th frames, the CNN performs learning by being repeatedly trained N times, and the N output tomographic images $O_m$, to $O_{m,N}$ are stored. Each time the output tomographic image $O_{m,n}$ is obtained, the output tomographic image $O_{m,n}$ may be compared with the second tomographic image $S_m$, and when the error between the images becomes a predetermined threshold value or less, the CNN processing step S13 may be terminated, and the finally obtained output tomographic image may be used as the tomographic image after the noise removal processing.

Figure 5:
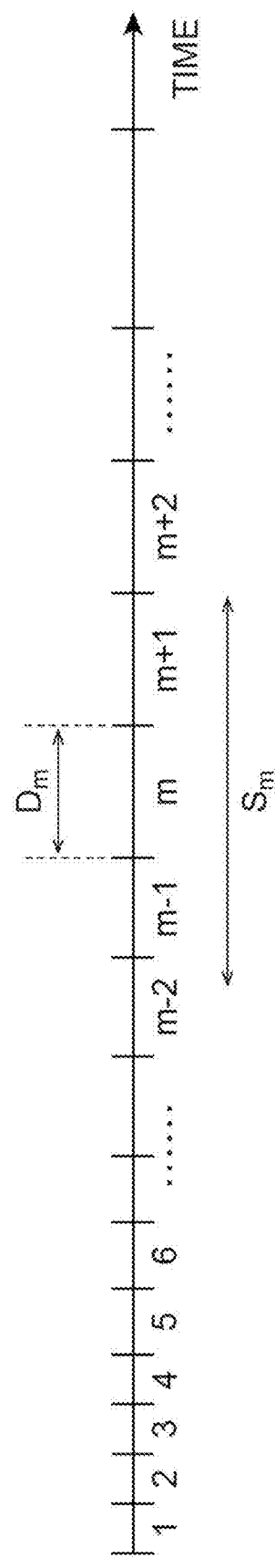
FIG. 5 is a diagram illustrating list data, a frame, a first tomographic image $D_m$, and a second tomographic image $S_m$.

FIG. 5 is a diagram illustrating the list data, the frame, the first tomographic image $D_m$, and the second tomographic image $S_m$. In this diagram, the horizontal axis represents the time for collecting the list data, and the time axis is divided into the plurality of frames. The first tomographic image $D_m$ of the m-th frame is a tomographic image reconstructed using a data group included in the m-th frame in the list data. The second tomographic image $S_m$ corresponding to the first tomographic image $D_m$ of the m-th frame is a tomographic image reconstructed using a data group with a data amount larger than that of the data group included in the m-th frame in the list data.

It is preferable that the second tomographic image $S_m$ corresponding to the first tomographic image $D_m$ of the m-th frame is created using a data group with a data amount that is twice or more the data group of the m-th frame. The second tomographic image $S_m$ corresponding to the first tomographic image $D_m$ of the m-th frame may be created using a data group including the data group of the m-th frame, or may be created using a data group before and after the data group of the m-th frame.

Figure 6:
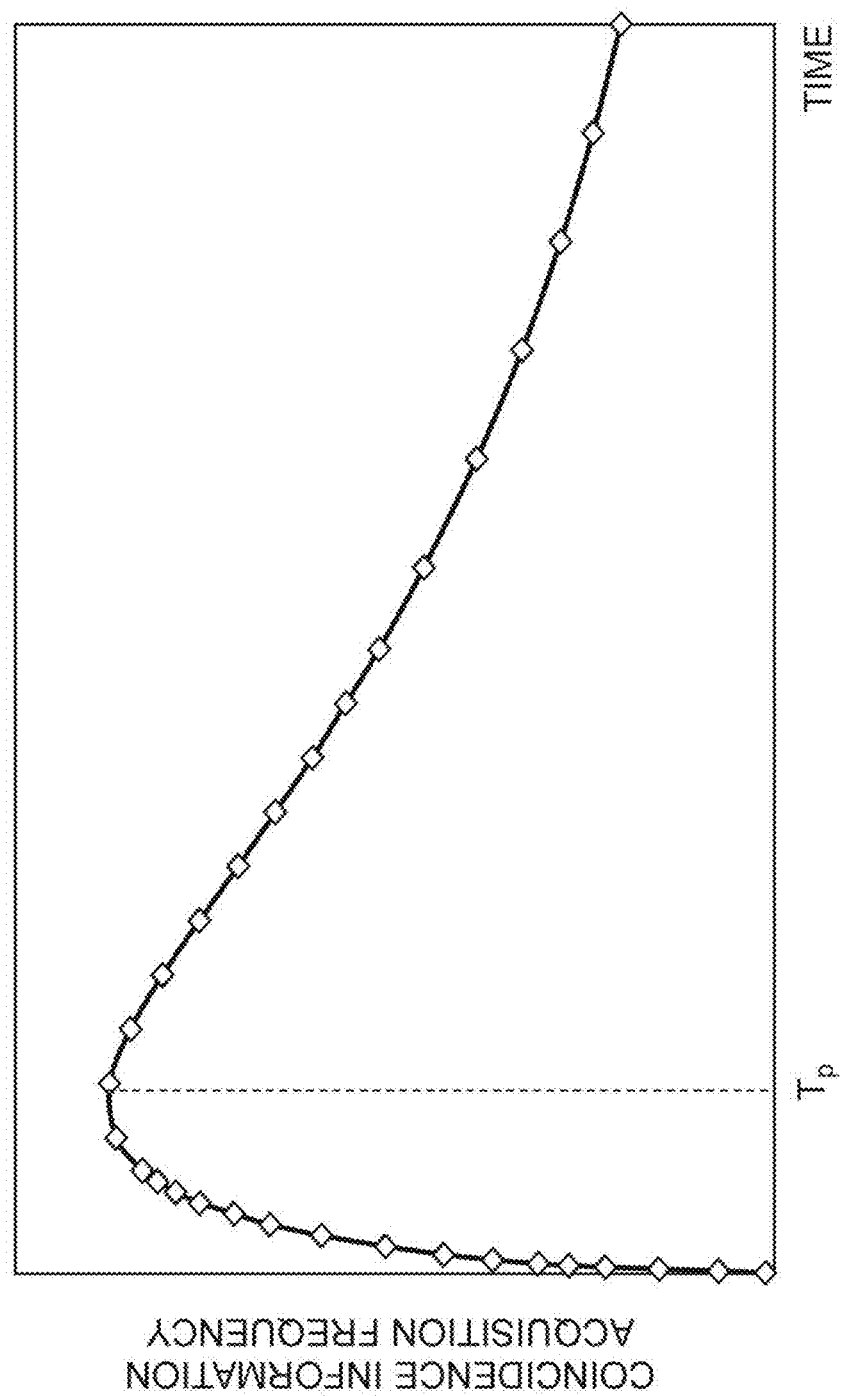
FIG. 6 is a graph showing a temporal change of acquisition frequency of coincidence information in an object into which an RI source is introduced.

FIG. 6 is a graph showing a temporal change of acquisition frequency of coincidence information in the object into which the RI source is introduced. In general, as shown in FIG. 6, the frequency of electron-positron annihilation in the object into which the RI source is introduced (coincidence information acquisition frequency) increases with time immediately after the input of the RI source, reaches a peak at a certain time Tp, and gradually decreases after the peak.

Therefore, in a period from the time immediately after the input of the RI source and in which the acquisition frequency of the coincidence information is high, the period of each frame is set to be relatively short, and in a subsequent period in which the acquisition frequency of the coincidence information gradually decreases, the period of each frame is set to be relatively long. Further, it is known that the tomographic image is significantly different between the period from the time immediately after the input of the RI source until the acquisition frequency of the coincidence information reaches the peak (before the time Tp) and the period after the peak (after the time Tp).

Accordingly, when the m-th frame is before the time Tp (blood flow dependent region) in FIG. 6, the second tomographic image $S_m$ corresponding to the first tomographic image $D_m$ of the m-th frame is preferably created using a data group before the time Tp in the list data. When the m-th frame is after the time Tp (PET ligand dynamic dependent region) in FIG. 6, the second tomographic image $S_m$ corresponding to the first tomographic image $D_m$ of the m-th frame is preferably created using a data group after the time Tp in the list data. The second tomographic image $S_m$ corresponding to the first tomographic image $D_m$ of the m-th frame may be created using the entire list data.

In the second image creation unit 12 (second image creation step S12), the second tomographic image $S_m$ corresponding to the first tomographic image $D_m$ of the m-th frame is preferably created by performing normalization such that the maximum pixel value of the second tomographic image $S_m$ is equal to the maximum pixel value of the first tomographic image $D_m$. That is, it is preferable to use a normalized second tomographic image $S_m$ expressed by the following Formula (1). $MaxD_m$ is the maximum pixel value in the first tomographic image $D_m$ of the m-th frame. $MaxS_m$ is the maximum pixel value in the second tomographic image $S_m$ corresponding to the first tomographic image $D_m$ of the m-th frame.

[Formula 1]

$$S_{m'} = S_m \left( \frac{\max D_m}{\max S_m} \right) \tag{1}$$

Figure 7:
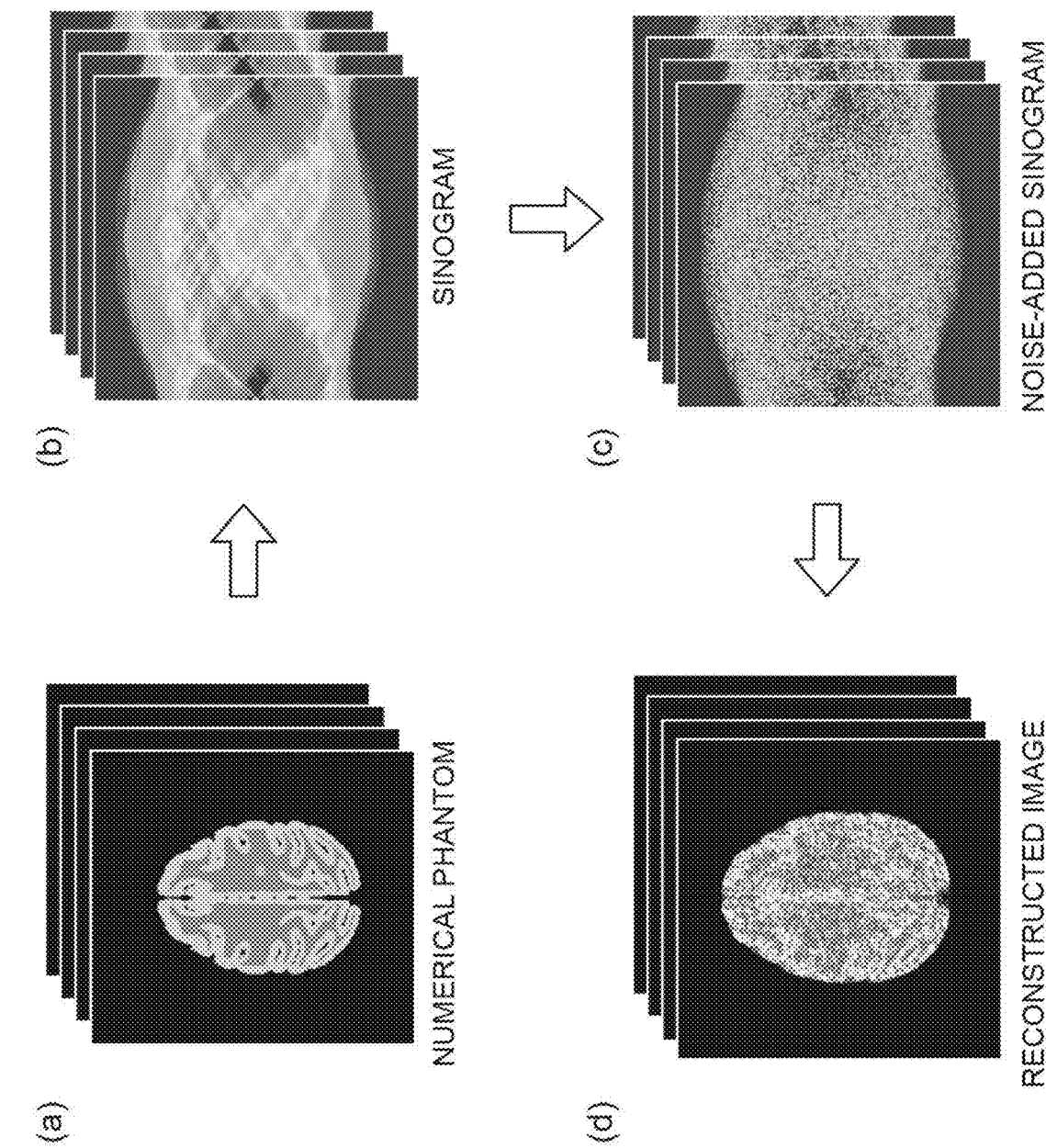
FIG. 7 includes diagrams illustrating a simulation method, and shows (a) a numerical phantom, (b) a sinogram, (c) a noise-added sinogram, and (d) a reconstructed image.

Next, simulation results will be described. FIG. 7 includes diagrams illustrating the simulation method. First, a numerical phantom ((a) in FIG. 7) was prepared. The numerical phantom simulates a tomographic image of a monkey brain into which $^{18}$F-FDG (fluorodeoxyglucose) is introduced. The above numerical phantom includes a white matter (WM) and a gray matter (GM) of brain.

Figure 8:
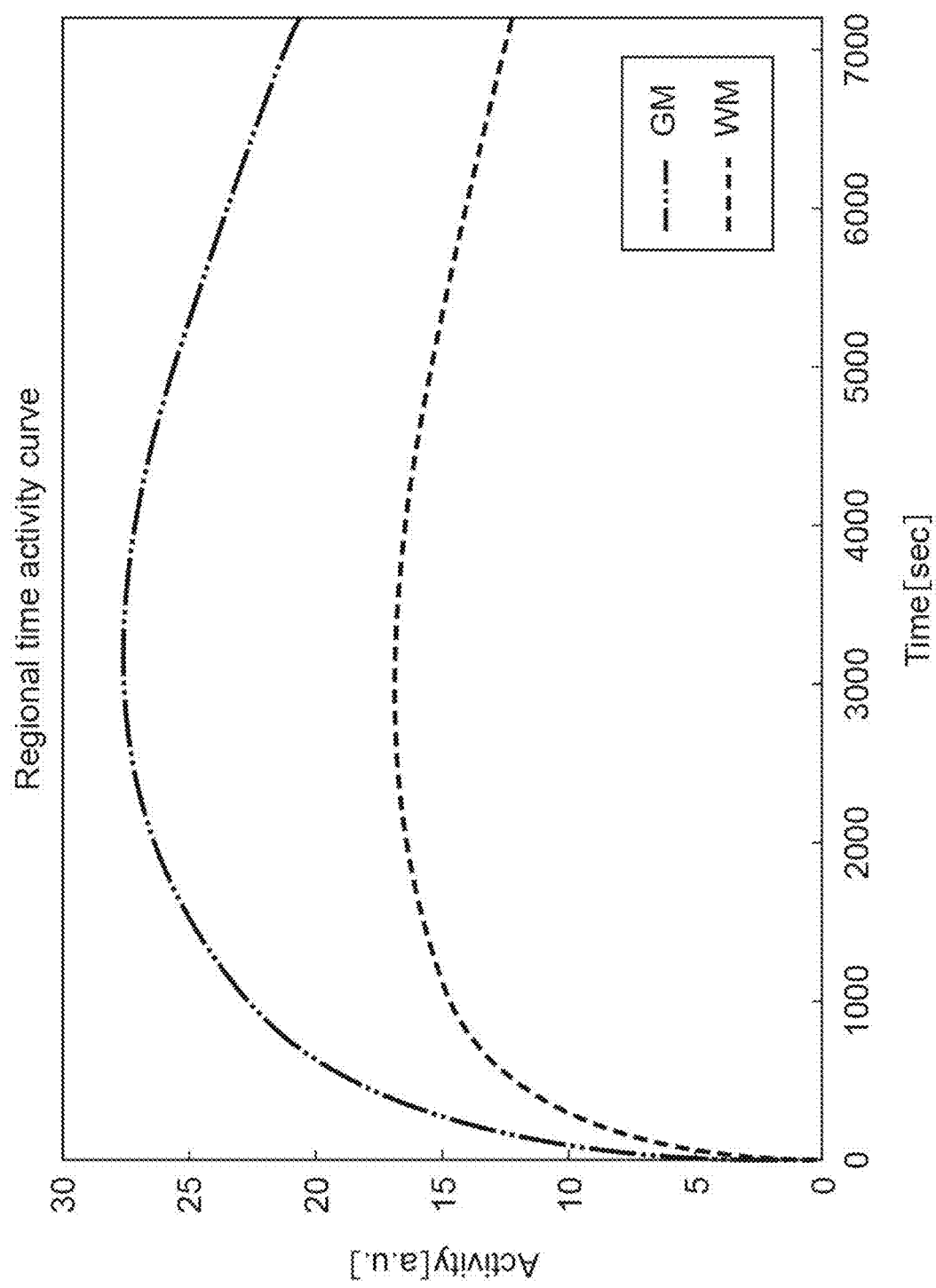
FIG. 8 is a graph showing a model of temporal changes of activities of a white matter (WM) and a gray matter (GM) used in the simulation.

FIG. 8 is a graph showing a model of temporal changes of activities of the white matter (WM) and the gray matter (GM) used in the simulation. In general, the temporal change of the activity (TAC: Time-Activity Curve) increases with time from the time immediately after the input of the RI source, reaches a peak at a certain time, and gradually decreases after the peak. The total number of counts (number of pieces of coincidence information) was set to 15,000,000.

Based on the above numerical phantom, a sinogram ((b) in FIG. 7) of each frame was created. The sinogram is a histogram of the coincidence information for each pair of radiation detectors in the radiation tomography apparatus 2. Each period for first to fourth frames was set to 20 seconds (subtotal 80 seconds), each period for fifth to eighth frames was set to 40 seconds (subtotal 160 seconds), each period for ninth to twelfth frames was set to 60 seconds (subtotal 240 seconds), each period for thirteenth to sixteenth frames was set to 180 seconds (subtotal 720 seconds), each period for seventeenth to thirtieth frames was set to 300 seconds (subtotal 4200 seconds), and the collection time of the entire list data was set to 5400 seconds (=90 minutes).

A noise-added sinogram ((c) in FIG. 7) was created by applying Poisson noise to the sinogram of each frame according to the number of counts of the frame. A reconstructed image ((d) in FIG. 7) was created by the ML-EM method based on the noise-added sinogram. The number of repetitions in the ML-EM method was set to 40.

Figure 9:
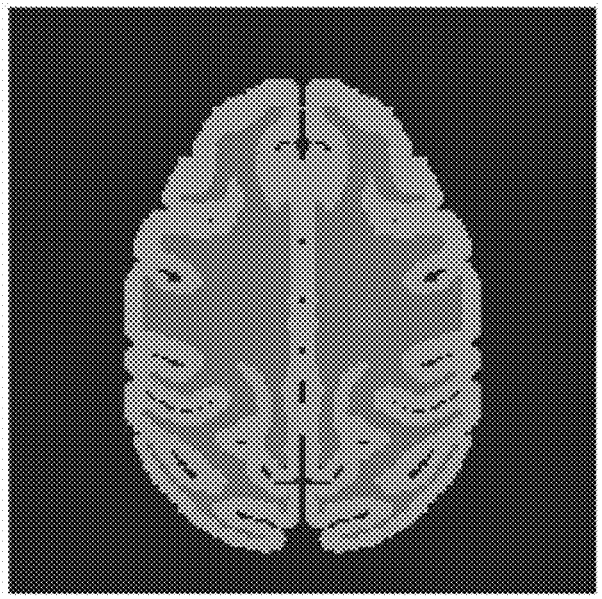
FIG. 9 is a diagram showing a numerical phantom image.
Figure 10:
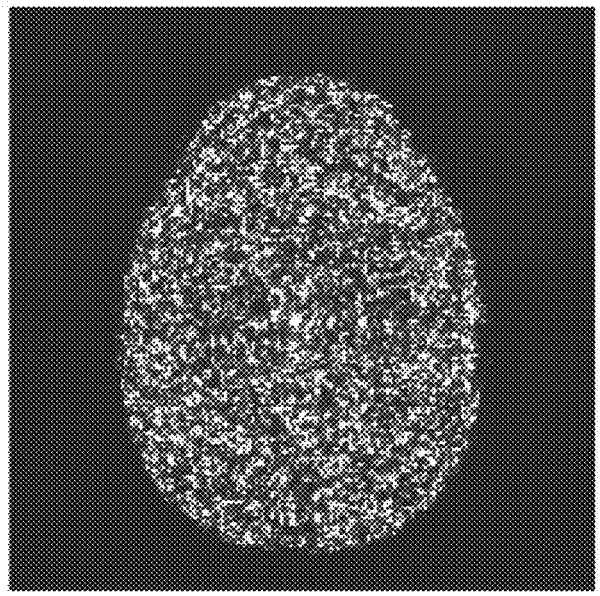
FIG. 10 is a diagram showing a first tomographic image of a sixth frame.
Figure 11:
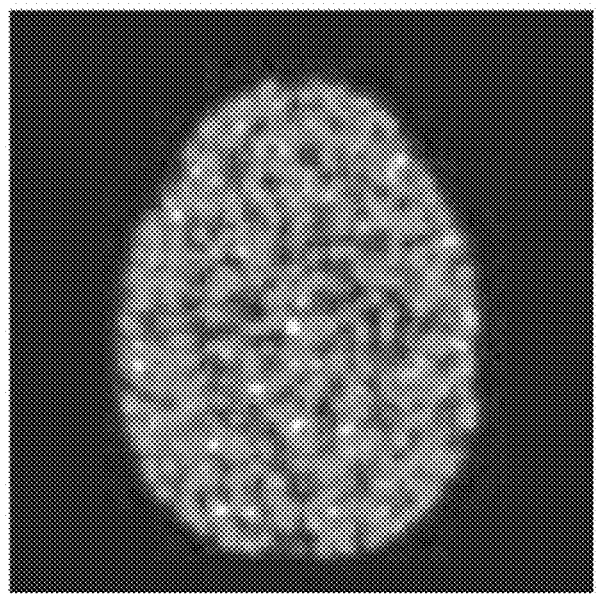
FIG. 11 is a diagram showing an image obtained by performing noise removal processing of a first comparative example on the first tomographic image of FIG. 10.
Figure 12:
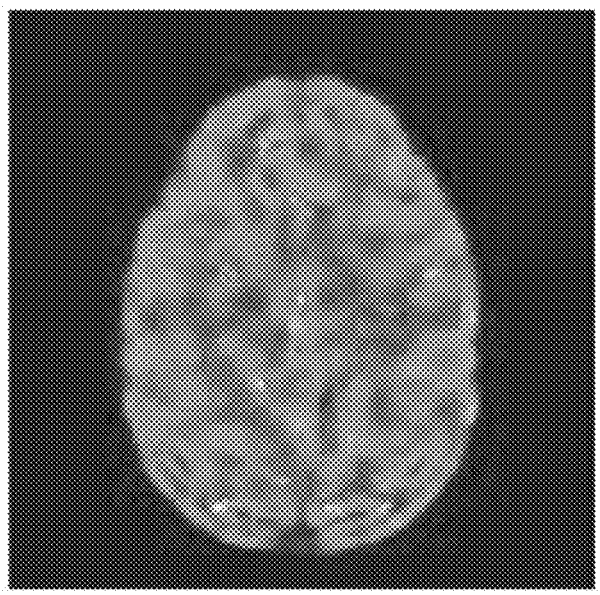
FIG. 12 is a diagram showing an image obtained by performing noise removal processing of a second comparative example on the first tomographic image of FIG. 10.

FIG. 9 is a diagram showing a numerical phantom image. FIG. 10 is a diagram showing a first tomographic image of a sixth frame. FIG. 11 is a diagram showing an image obtained by performing noise removal processing of a first comparative example on the first tomographic image of FIG. 10. The noise removal processing of the first comparative example is processing by the Gaussian filter. FIG. 12 is a diagram showing an image obtained by performing noise removal processing of a second comparative example on the first tomographic image of FIG. 10. The noise removal processing of the second comparative example is processing described in Non Patent Document 2.

Figure 13:
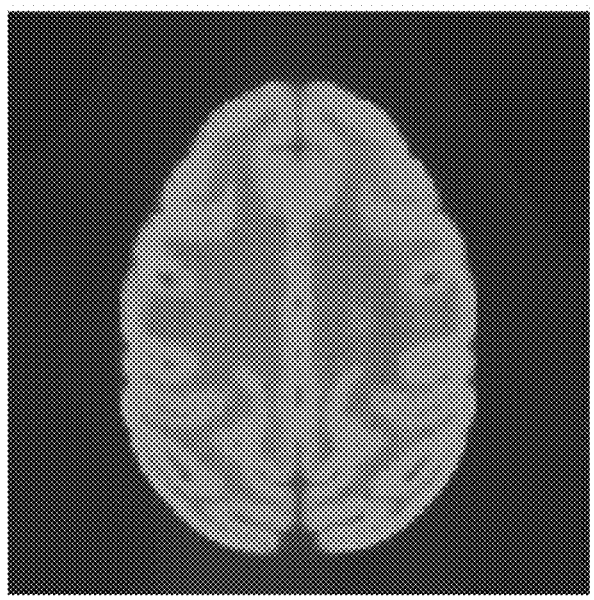
FIG. 13 is a diagram showing an output tomographic image selected by performing CNN processing of the present embodiment on the first tomographic image of FIG. 10.

FIG. 13 is a diagram showing an output tomographic image selected by performing the CNN processing of the present embodiment on the first tomographic image of FIG. 10. In this image, a normalized second tomographic image S created using the entire list data is used. As can be seen from the comparison of these diagrams, compared with the noise removal processing of the first and second comparative examples, in the noise removal processing of the present embodiment, the boundary of the shading in the image is well preserved, and the noise is well removed, and in addition, the unnaturalness of the processed image is reduced.

Figure 14:
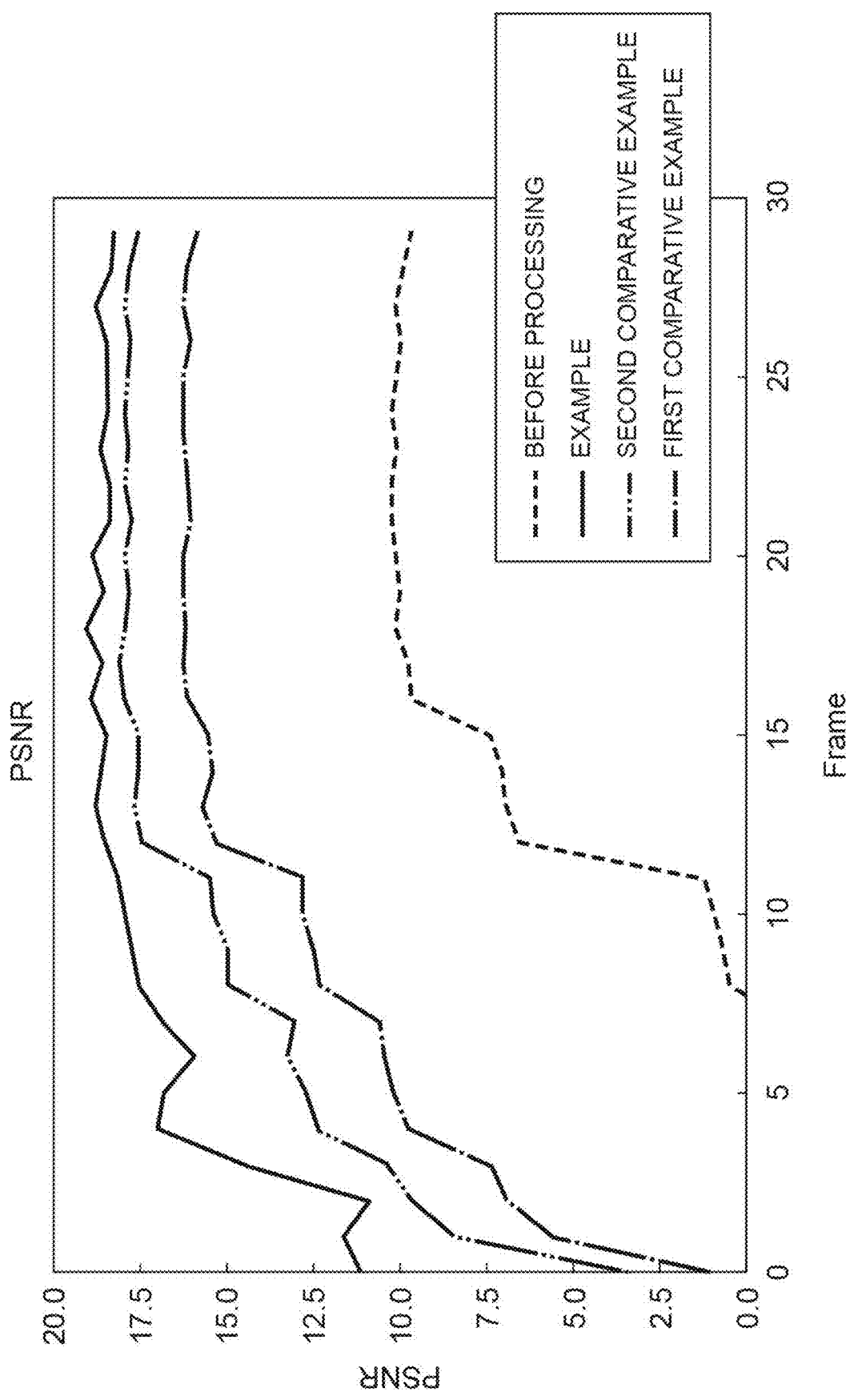
FIG. 14 is a graph showing a temporal change of PSNR of a reconstructed image for each of the first comparative example, the second comparative example, and the present embodiment obtained in the simulation.

FIG. 14 is a graph showing the temporal change of PSNR of the reconstructed image for each of the first comparative example, the second comparative example, and the present embodiment obtained in the simulation. The PSNR (Peak Signal to Noise Ratio) represents the quality of the image in decibels (dB), and a higher value means better image quality.

Figure 15:
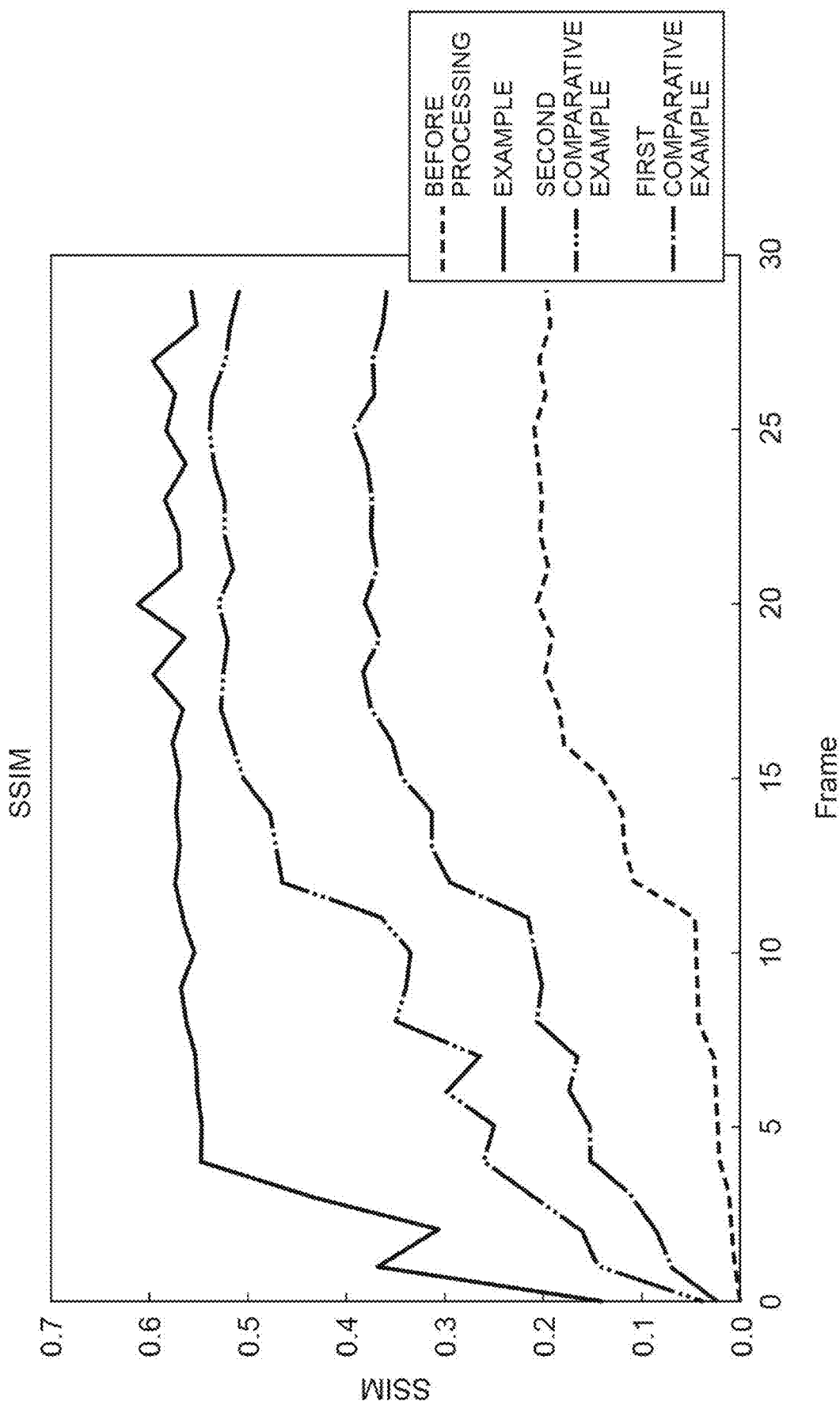
FIG. 15 is a graph showing a temporal change of SSIM of a reconstructed image for each of the first comparative example, the second comparative example, and the present embodiment obtained in the simulation.

FIG. 15 is a graph showing the temporal change of SSIM of the reconstructed image for each of the first comparative example, the second comparative example, and the present embodiment obtained in the simulation. The SSIM (Structural Similarity Index) is an index for quantifying the change of the intensity, contrast, and structure in the image, and a higher value means better image quality.

Both indexes of PSNR and SSIM show better performance for the noise removal processing of the present embodiment compared with the noise removal processing of the first and second comparative examples. For other frames also, the noise removal processing of the present embodiment has better performance.

Next, an example will be described. In this example, a rhesus monkey brain with $^{18}$F-FDG was used as the object. As the PET apparatus, an animal PET apparatus (SHR-38000) manufactured by Hamamatsu Photonics K.K. was used. The transmission measurement was performed for 30 minutes, the emission measurement was performed for 90 minutes, and absorption correction was performed on the emission measurement result based on the transmission measurement result. The list data was divided into first to thirtieth frames. The reconstructed image of each frame was created by the DRAMA method.

Figure 16:
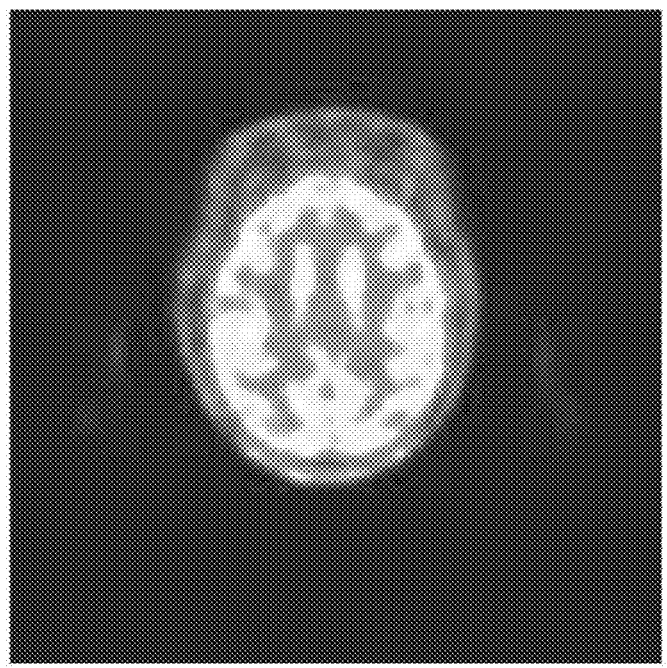
FIG. 16 is a diagram showing a second tomographic image created using entire list data.
Figure 17:
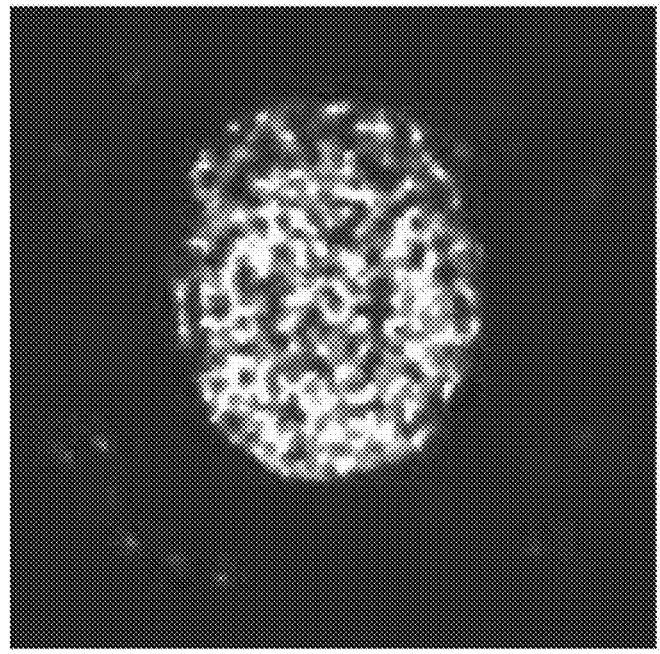
FIG. 17 is a diagram showing a first tomographic image of a sixth frame.
Figure 18:
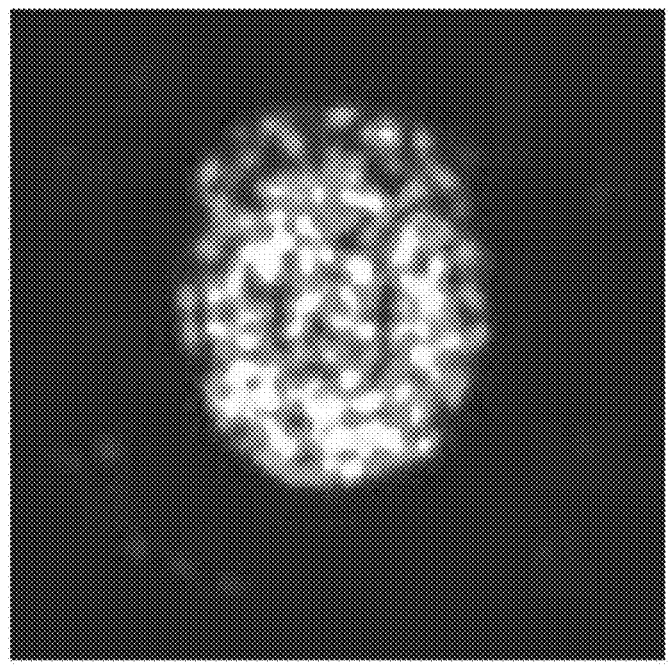
FIG. 18 is a diagram showing an image obtained by performing noise removal processing of the first comparative example on the first tomographic image of FIG. 17.
Figure 19:
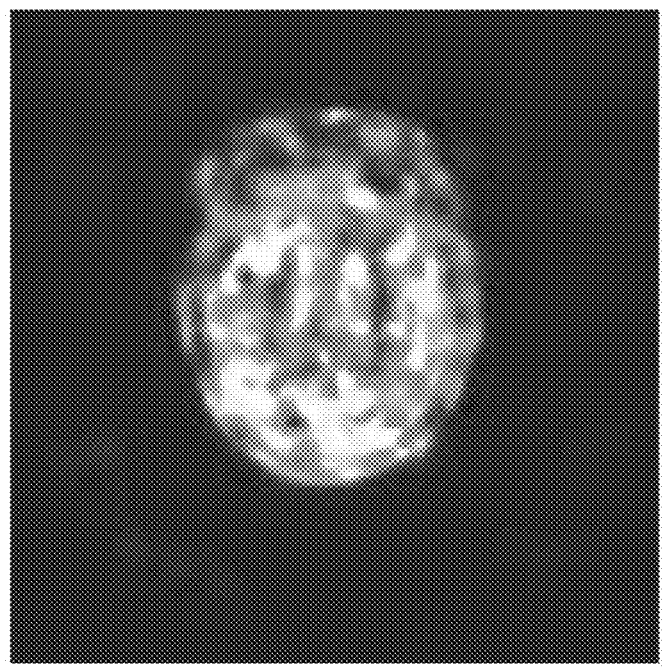
FIG. 19 is a diagram showing an image obtained by performing noise removal processing of the second comparative example on the first tomographic image of FIG. 17.

FIG. 16 is a diagram showing a second tomographic image created using the entire list data. FIG. 17 is a diagram showing a first tomographic image of a sixth frame. FIG. 18 is a diagram showing an image obtained by performing the noise removal processing of the first comparative example on the first tomographic image of FIG. 17. FIG. 19 is a diagram showing an image obtained by performing the noise removal processing of the second comparative example on the first tomographic image of FIG. 17.

Figure 20:
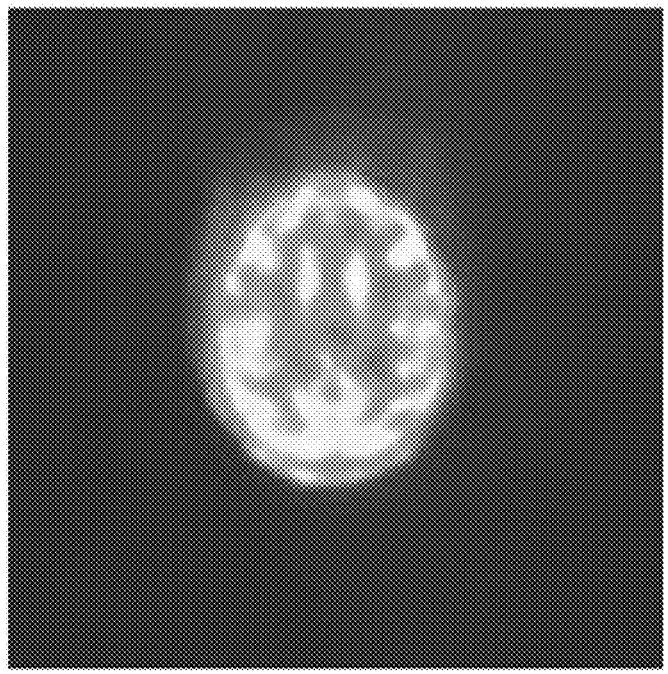
FIG. 20 is a diagram showing an output tomographic image (n=30) selected by performing CNN processing of an example on the first tomographic image of FIG. 17.
Figure 21:
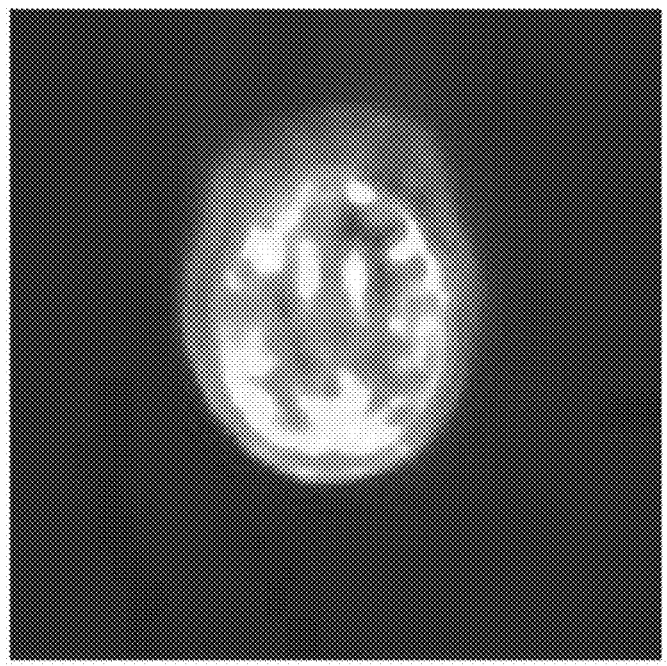
FIG. 21 is a diagram showing an output tomographic image (n=100) selected by performing CNN processing of the example on the first tomographic image of FIG. 17.
Figure 22:
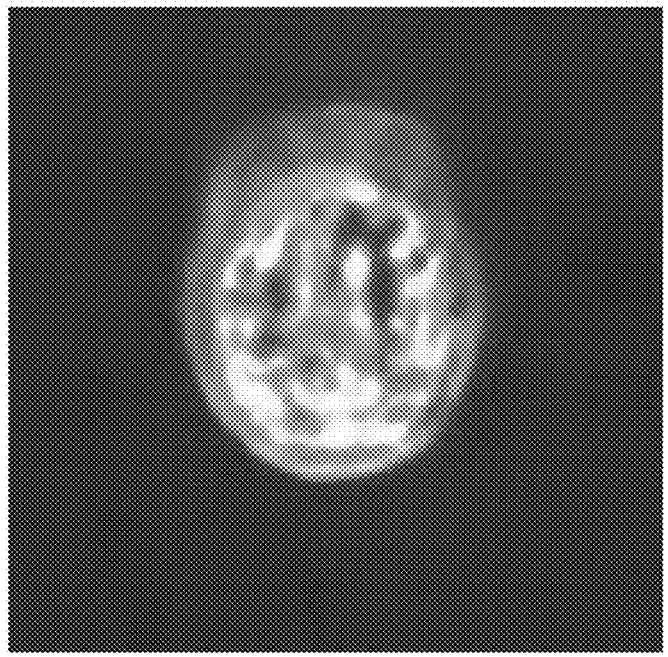
FIG. 22 is a diagram showing an output tomographic image (n=200) selected by performing CNN processing of the example on the first tomographic image of FIG. 17.
Figure 23:
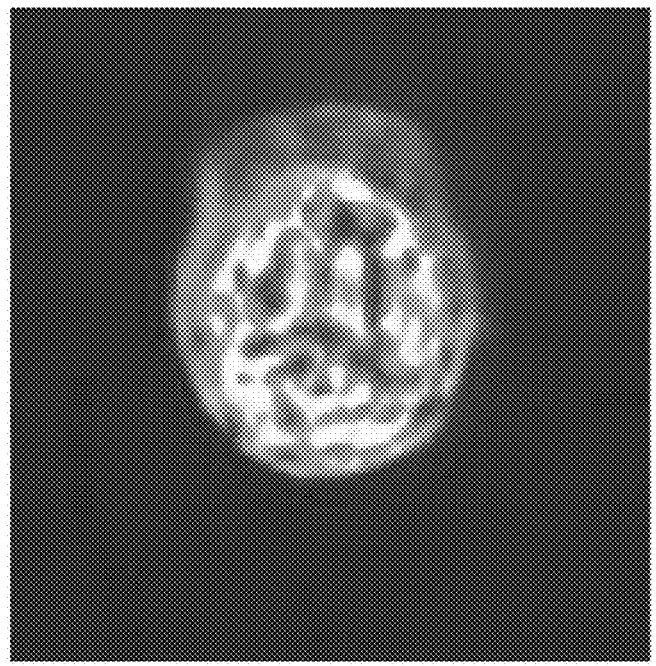
FIG. 23 is a diagram showing an output tomographic image (n=300) selected by performing CNN processing of the example on the first tomographic image of FIG. 17.

FIG. 20 to FIG. 23 are diagrams showing output tomographic images selected by performing the CNN processing of the example on the first tomographic image of FIG. 17. FIG. 20 shows the output tomographic image in the case of n=30. FIG. 21 shows the output tomographic image in the case of n=100. FIG. 22 shows the output tomographic image in the case of n=200. FIG. 23 shows the output tomographic image in the case of n=300.

The above example also shows better performance for the noise removal processing of the present example compared with the noise removal processing of the first and second comparative examples. Further, in FIG. 20 to FIG. 23 showing the output tomographic images of the present example, the output tomographic image of FIG. 22 (n=100) is the most natural image, and has a close error with the second tomographic image of FIG. 16. That is, it is understood that a more natural output tomographic image can be acquired by appropriately selecting the number of times of training n.

Figure 24:
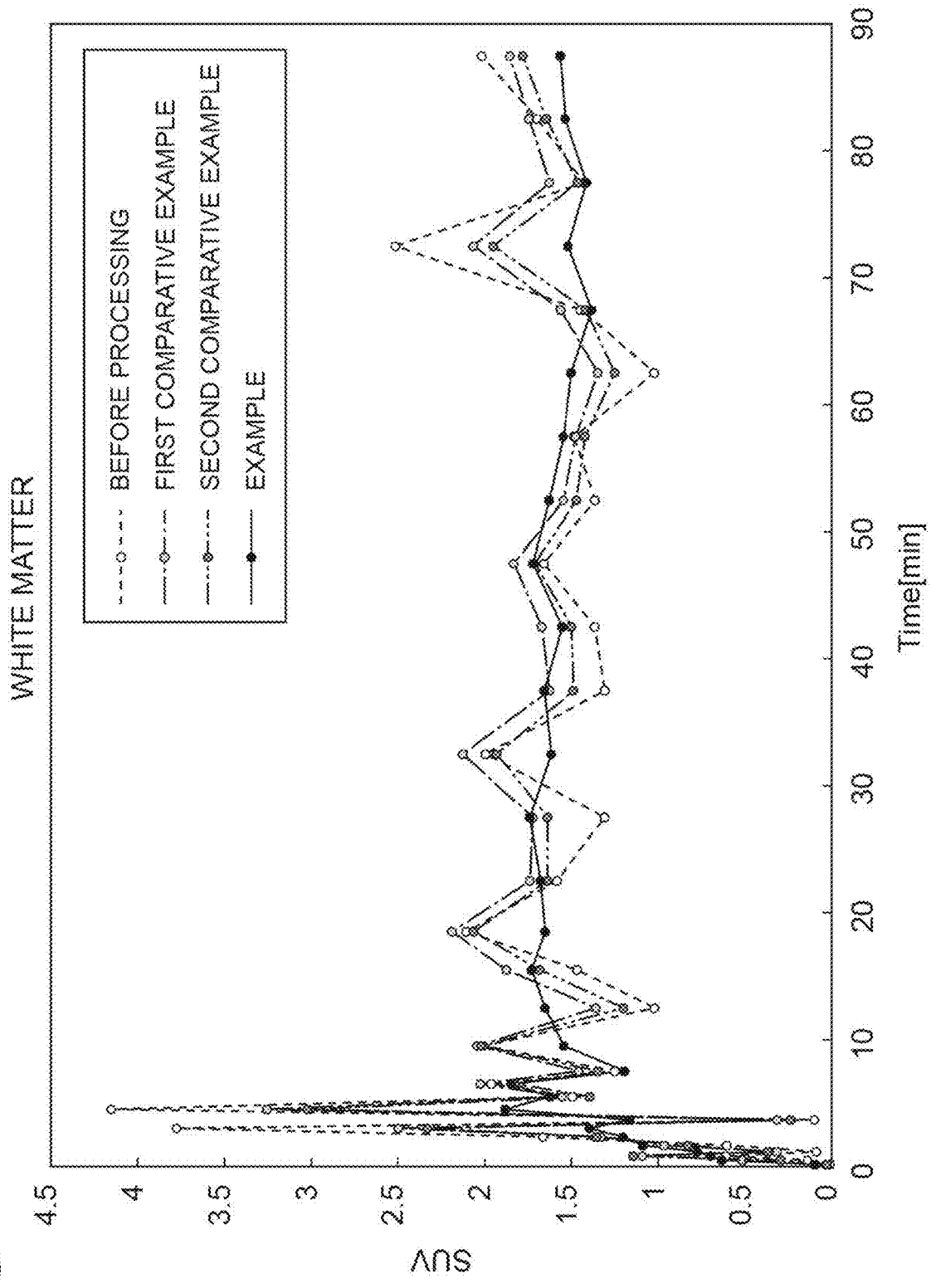
FIG. 24 is a diagram showing a TAC for the white matter (WM).
Figure 25:
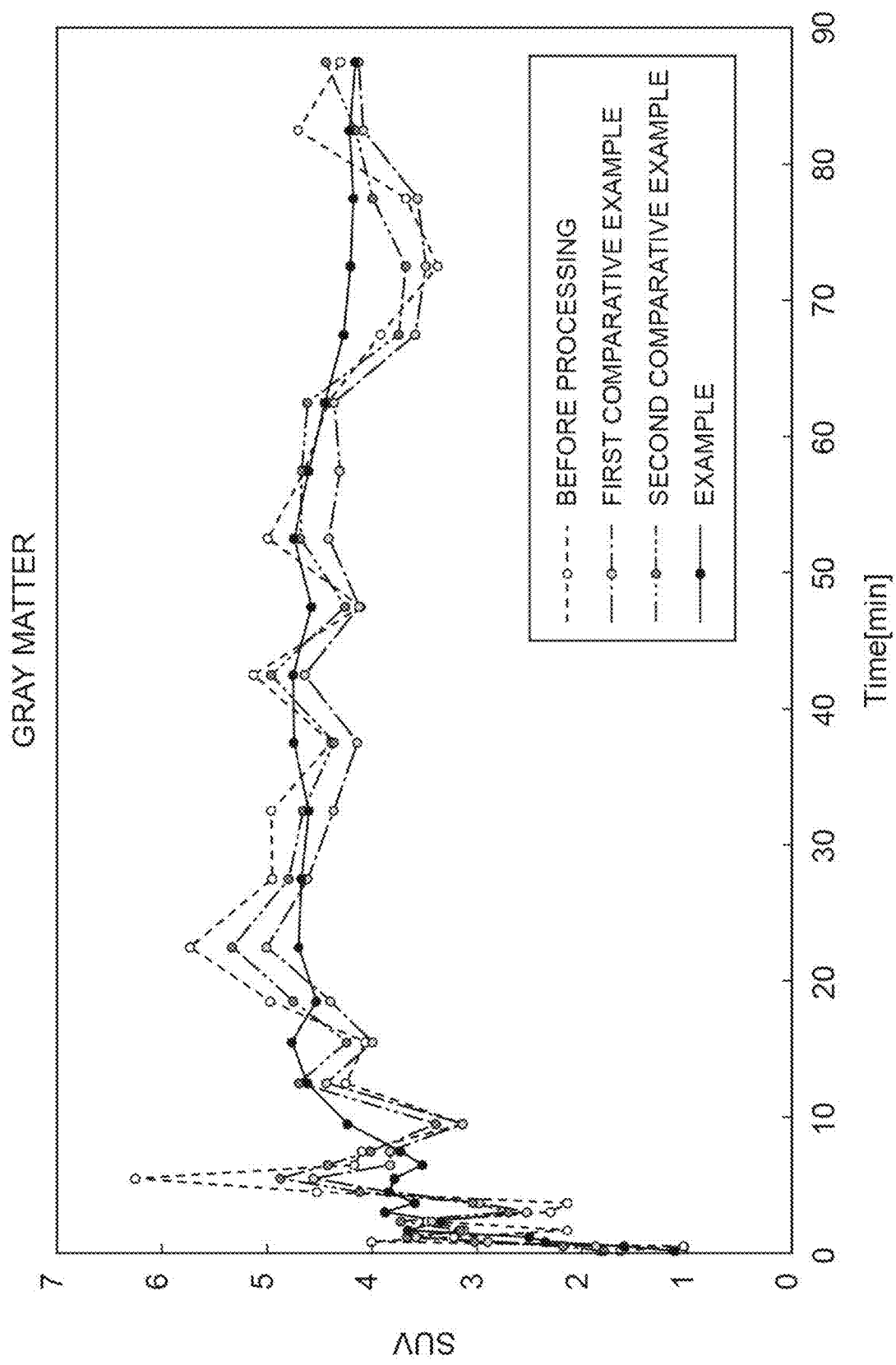
FIG. 25 is a diagram showing a TAC for the gray matter (GM).

FIG. 24 is a diagram showing the TAC for the white matter (WM). FIG. 25 is a diagram showing the TAC for the gray matter (GM). In both the whiter matter and the gray matter, the TAC temporally changes more slowly in the case of the noise removal processing of the present example than in the case of the noise removal processing of the first and second comparative examples. This also shows better performance for the noise removal processing of the present embodiment. Statistical analysis and model analysis can be performed by using the TAC, and a large temporal variation in the TAC may cause a large error in a quantitative value.

The present invention is not limited to the above embodiments and configuration examples, and various modifications are possible. For example, the radiation tomography apparatus 2 is a PET apparatus in the above embodiment, but may be a SPECT apparatus.

The image processing apparatus of the above embodiment is an apparatus for creating a tomographic image after noise removal processing based on list data collected by a radiation tomography apparatus, and includes (1) a first image creation unit for dividing the list data into a plurality of frames in a collection order, and performing reconstruction processing for each of the plurality of frames using a data group in the list data included in the frame to create a first tomographic image of the frame; (2) a second image creation unit for performing reconstruction processing using a data group in the list data having a data amount larger than that of the data group used in creating the first tomographic image of each frame in the first image creation unit to create a second tomographic image; and (3) a CNN processing unit for generating a plurality of output tomographic images by, for each of the plurality of frames, repeatedly inputting the second tomographic image to a convolutional neural network, outputting an output tomographic image from the convolutional neural network, and training the convolutional neural network based on a comparison between the output tomographic image and the first tomographic image.

The above image processing apparatus may further include an image selection unit for selecting, for each of the plurality of frames, one output tomographic image from the plurality of output tomographic images as the tomographic image after the noise removal processing. In this case, the image selection unit may select, for each of the plurality of frames, the one output tomographic image from the plurality of output tomographic images based on a comparison between the output tomographic image and the second tomographic image.

In the above image processing apparatus, the second image creation unit may use, in creating the second tomographic image corresponding to the first tomographic image of each frame, a data group including the data group used in creating the first tomographic image of the frame in the first image creation unit. Further, the second image creation unit may use, in creating the second tomographic image corresponding to the first tomographic image of each frame, a data group before and after the data group used in creating the first tomographic image of the frame in the first image creation unit.

The radiation tomography system of the above embodiment includes a radiation tomography apparatus for collecting list data for reconstructing a tomographic image of an object; and the image processing apparatus of the above configuration for creating the tomographic image after the noise removal processing based on the list data collected by the radiation tomography apparatus.

The image processing method of the above embodiment is a method for creating a tomographic image after noise removal processing based on list data collected by a radiation tomography apparatus, and includes (1) a first image creation step of dividing the list data into a plurality of frames in a collection order, and performing reconstruction processing for each of the plurality of frames using a data group in the list data included in the frame to create a first tomographic image of the frame; (2) a second image creation step of performing reconstruction processing using a data group in the list data having a data amount larger than that of the data group used in creating the first tomographic image of each frame in the first image creation step to create a second tomographic image; and (3) a CNN processing step of generating a plurality of output tomographic images by, for each of the plurality of frames, repeatedly inputting the second tomographic image to a convolutional neural network, outputting an output tomographic image from the convolutional neural network, and training the convolutional neural network based on a comparison between the output tomographic image and the first tomographic image.

The above image processing method may further include an image selection step of selecting, for each of the plurality of frames, one output tomographic image from the plurality of output tomographic images as the tomographic image after the noise removal processing. In this case, in the image selection step, for each of the plurality of frames, the one output tomographic image may be selected from the plurality of output tomographic images based on a comparison between the output tomographic image and the second tomographic image.

In the above image processing method, in the second image creation step, in creating the second tomographic image corresponding to the first tomographic image of each frame, a data group including the data group used in creating the first tomographic image of the frame in the first image creation step may be used. Further, in the second image creation step, in creating the second tomographic image corresponding to the first tomographic image of each frame, a data group before and after the data group used in creating the first tomographic image of the frame in the first image creation step may be used.

INDUSTRIAL APPLICABILITY

The present invention can be used as an apparatus and a method capable of creating a noise-removed tomographic image with high performance based on list data collected by a radiation tomography apparatus.

REFERENCE SIGNS LIST

1—radiation tomography system, 2—radiation tomography apparatus, 10—image processing apparatus, 11—first image creation unit, 12—second image creation unit, 13—CNN processing unit, 14—image selection unit, 15—storage unit.

The invention claimed is:

1. An image processing apparatus for creating a tomographic image after noise removal processing based on list data collected by a radiation tomography apparatus, the apparatus comprising:
    a first image creation unit configured to divide the list data into a plurality of frames in a collection order, and perform reconstruction processing for each of the plurality of frames using a data group in the list data included in the frame to create a first tomographic image of the frame;
    a second image creation unit configured to perform reconstruction processing using a data group in the list data having a data amount larger than that of the data group used in creating the first tomographic image of each frame in the first image creation unit to create a second tomographic image; and
    a CNN processing unit configured to generate a plurality of output tomographic images by, for each of the plurality of frames, repeatedly inputting the second tomographic image to a convolutional neural network, outputting an output tomographic image from the convolutional neural network, and training the convolutional neural network based on a comparison between the output tomographic image and the first tomographic image, wherein
    the second image creation unit is configured to use, in creating the second tomographic image corresponding to the first tomographic image of each frame, a data group including the data group used in creating the first tomographic image of the frame in the first image creation unit.

2. The image processing apparatus according to claim 1, further comprising an image selection unit configured to select, for each of the plurality of frames, one output tomographic image from the plurality of output tomographic images as the tomographic image after the noise removal processing.

3. The image processing apparatus according to claim 2, wherein the image selection unit is configured to select, for each of the plurality of frames, the one output tomographic image from the plurality of output tomographic images based on a comparison between the output tomographic image and the second tomographic image.

4. An image processing apparatus for creating a tomographic image after noise removal processing based on list data collected by a radiation tomography apparatus, the apparatus comprising:
    a first image creation unit configured to divide the list data into a plurality of frames in a collection order, and perform reconstruction processing for each of the plurality of frames using a data group in the list data included in the frame to create a first tomographic image of the frame;
    a second image creation unit configured to perform reconstruction processing using a data group in the list data having a data amount larger than that of the data group used in creating the first tomographic image of each frame in the first image creation unit to create a second tomographic image; and
    a CNN processing unit configured to generate a plurality of output tomographic images by, for each of the plurality of frames, repeatedly inputting the second tomographic image to a convolutional neural network, outputting an output tomographic image from the convolutional neural network, and training the convolutional neural network based on a comparison between the output tomographic image and the first tomographic image, wherein
    the second image creation unit is configured to use, in creating the second tomographic image corresponding to the first tomographic image of each frame, a data group before and after the data group used in creating the first tomographic image of the frame in the first image creation unit.

5. A radiation tomography system comprising:
a radiation tomography apparatus configured to collect list data for reconstructing a tomographic image of an object; and
the image processing apparatus according to claim 1 configured to create the tomographic image after the noise removal processing based on the list data collected by the radiation tomography apparatus.

6. An image processing method for creating a tomographic image after noise removal processing based on list data collected by a radiation tomography apparatus, the method comprising:
performing a first image creation of dividing the list data into a plurality of frames in a collection order, and performing reconstruction processing for each of the plurality of frames using a data group in the list data included in the frame to create a first tomographic image of the frame;
performing a second image creation of performing reconstruction processing using a data group in the list data having a data amount larger than that of the data group used in creating the first tomographic image of each frame in the first image creation to create a second tomographic image; and
performing CNN processing of generating a plurality of output tomographic images by, for each of the plurality of frames, repeatedly inputting the second tomographic image to a convolutional neural network, outputting an output tomographic image from the convolutional neural network, and training the convolutional neural network based on a comparison between the output tomographic image and the first tomographic image, wherein
in the second image creation, in creating the second tomographic image corresponding to the first tomographic image of each frame, a data group including the data group used in creating the first tomographic image of the frame in the first image creation is used.

7. The image processing method according to claim 6, further comprising performing an image selection of selecting, for each of the plurality of frames, one output tomographic image from the plurality of output tomographic images as the tomographic image after the noise removal processing.

8. The image processing method according to claim 7, wherein in the image selection, for each of the plurality of frames, the one output tomographic image is selected from the plurality of output tomographic images based on a comparison between the output tomographic image and the second tomographic image.

9. An image processing method for creating a tomographic image after noise removal processing based on list data collected by a radiation tomography apparatus, the method comprising:
performing a first image creation of dividing the list data into a plurality of frames in a collection order, and performing reconstruction processing for each of the plurality of frames using a data group in the list data included in the frame to create a first tomographic image of the frame;
performing a second image creation of performing reconstruction processing using a data group in the list data having a data amount larger than that of the data group used in creating the first tomographic image of each frame in the first image creation to create a second tomographic image; and
performing CNN processing of generating a plurality of output tomographic images by, for each of the plurality of frames, repeatedly inputting the second tomographic image to a convolutional neural network, outputting an output tomographic image from the convolutional neural network, and training the convolutional neural network based on a comparison between the output tomographic image and the first tomographic image, wherein
in the second image creation, in creating the second tomographic image corresponding to the first tomographic image of each frame, a data group before and after the data group used in creating the first tomographic image of the frame in the first image creation is used.

10. The image processing apparatus according to claim 4, further comprising an image selection unit configured to select, for each of the plurality of frames, one output tomographic image from the plurality of output tomographic images as the tomographic image after the noise removal processing.

11. The image processing apparatus according to claim 10, wherein the image selection unit is configured to select, for each of the plurality of frames, the one output tomographic image from the plurality of output tomographic images based on a comparison between 10 the output tomographic image and the second tomographic image.

12. A radiation tomography system comprising:
a radiation tomography apparatus configured to collect list data for reconstructing a tomographic image of an object; and
the image processing apparatus according to claim 4 configured to create the tomographic image after the noise removal processing based on the list data collected by the radiation tomography apparatus.

13. The image processing method according to claim 9, further comprising performing an image selection of selecting, for each of the plurality of frames, one output tomographic image from the plurality of output tomographic images as the tomographic image after the noise removal processing.

14. The image processing method according to claim 13, wherein in the image selection, for each of the plurality of frames, the one output tomographic image is selected from the plurality of output tomographic images based on a comparison between the output tomographic image and the second tomographic image.

* * * * *